United States Patent

[11] 3,629,540

[72] Inventors Hans Altfeld
Constance;
Ewald Sauter, Litzelstetten, both of Germany
[21] Appl. No. 50,803
[22] Filed June 29, 1970
[45] Patented Dec. 21, 1971
[73] Assignee Altfeld & Co. GmbH
Constance (Bodensee), Germany
[32] Priority July 3, 1969
[33] Germany
[31] P 19 33 775.8

[54] SPARK EROSION HEAD WITH MEANS FOR ROTATING AND GYRATING THE ELECTRODE
9 Claims, 7 Drawing Figs.
[52] U.S. Cl. .................................................. 219/69 V, 219/69 E
[51] Int. Cl. ............................................... B23p 1/12

[50] Field of Search ........................................... 219/69 V, 69 E

[56] References Cited
UNITED STATES PATENTS
2,974,216   3/1961   Inoue ........................... 219/69 V
3,430,026   2/1969   O'Connor ..................... 219/69 V Primary Examiner—R. F. Staubly
Attorney—Karl F. Ross ABSTRACT: The electrode-carrying head of an electrodischarge machining (EDM) apparatus includes a planetary-gear arrangement for rotating the electrode about its own axis as the electrode axis is, in turn, displaced relatively to the workpiece. This system enables the use of an electrode for various machining modes and eliminates the need for tool electrodes precisely complementary to the configuration to be produced.

INVENTORS:
HANS ALTFELD
EWALD SAUTER
BY Karl F. Ross
ATTORNEY

PATENTED DEC 21 1971

INVENTORS:
HANS ALTFELD
EWALD SAUTER
BY
Karl J. Ross
ATTORNEY

SPARK EROSION HEAD WITH MEANS FOR ROTATING AND GYRATING THE ELECTRODE

1. FIELD OF THE INVENTION

Out present invention relates to an electrodischarge machining (EDM) apparatus and, more particularly, to the electrode head of a spark-erosion or electrodischarge machining apparatus.

2. OBJECTS OF THE INVENTION

It is, therefore, the principal object of the present invention to provide a system for increasing the versatility of spark-erosion or electrodischarge machining.

Another object of this invention is the provision of a head for an electrodischarge machine which enables a single electrode to be used for a variety of different contours or dimensions of cavities or shapes to be formed in a workpiece.

3. SUMMARY OF THE INVENTION

These objects and others which will become apparent hereinafter, are attained, in accordance with the present invention, in a head for a spark-erosion or electrodischarge machining apparatus which comprises means for rotating the electrode about its own axis while enabling relative displacement of the workpiece and the electrode axis to produce a variety of contours of the machining process. Rotation of the electrode, or the electrode holder, in the head of the spark-erosion machine, about its own axis, continuously brings fresh electrode surface into juxtaposition with the workpiece surfaces subjected to the spark discharge and thereby prevents excessive wear of any particular portion of the electrode; hence the change in shape of the electrode remains uniform during the machining process and the configuration of the contour formed in the workpiece will depend not upon the shape of the electrode, but upon the movement or path of the electrode relative to the workpiece.

According to a specific feature of this invention, the spark-erosion head comprises a housing rotatably receiving an electrode holder and containing a drive, e.g., a planetary gear transmission, coupled with the electrode holder for rotating the electrode holder (and any electrode received therein) about its own axis. An important feature of the invention resides in the provision of means enabling relative displacement of the electrode holder and the housing, such means being provided to permit the electrode holder to move in an axial or radial direction in space, i.e., relative to the workpiece. The invention also includes the provision of means for adjusting the position of the electrode holder, preferably with manual means or a template, cam or the like to form any desired contour in the workpiece. Of particular advantage is the provision of an adjusting screw with extremely steep pitch and a large number of threads per unit length so that a precision adjustment of the position of the electrode holder, e.g., to within about 0.001 mm., is possible.

Since the tool electrode is not under any significant force either by virtue of the resistance of the workpiece, or the pressure of dielectric, we have found it advantageous simply to journal the tool in a bearing block which, in turn, is provided with a three-point resilient connection within the housing. Advantageously, a conical centering arrangement is also provided. The pointlike supports for the bearing block may comprise resilient means, e.g., Belleville washers or dished-disk springs bearing upon plungers or pins engaging the bearing block in the axial direction and contacting the bearing block at regions of limited area, approximating point contacts.

According to still another feature of this invention, the rotatable housing and the transmission-drive shaft, are rotatably mounted, in accordance with the present invention, in a flange of the spark-erosion machine which, in turn, is held on the remainder of the apparatus by three-point resilient support and can be centered, e.g., with centering pins, such that any irregularities in the position of the rotating housing and head structure can be eliminated.

In a preferred embodiment of the invention, the rotatable housing of the spark erosion head is formfitting around the drive shaft or a forced-transmitting relationship therewith and, to this end, includes a cylindrical sleeve rotatably receiving and coaxial with the drive shaft. The planetary-gear transmission, moreover, may include a driven sun gear which is held fixed with respect to the housing and is coaxially journaled on the aforementioned housing sleeve, planetary gearing rotatably mounted on that housing and meshing with the fixed sun gear, and a driven pinion, connected with the electrode holder, which is operatively connected with one of the planetary gears. Advantageously, the latter connection is effected by a spring-loaded gear arrangement enabling movement of the pinion gear and the electrode-holder combination with respect to the housing by the adjusting means mentioned earlier.

It will be apparent that this arrangement enables a variety of spark-erosion-machining operations, e.g., the formation of bores or cavities of different diameters or the production of planar surfaces or other contours of various size without substitution of appropriately contoured electrodes and without excessive wear of the electrode at limited regions where such wear would tend to alter the machined contours. Hence, the system is particularly effective with continuously supplied spark-erosion electrodes, e.g., in the form of a wire which is fed to maintain a constant length in the region of the workpiece.

4. DESCRIPTION OF THE DRAWING

The above and other objects and features of the invention will become more readily apparent from the following description, reference being made to the accompanying drawing, in which.

5. SPECIFIC DESCRIPTION

Figure 7:
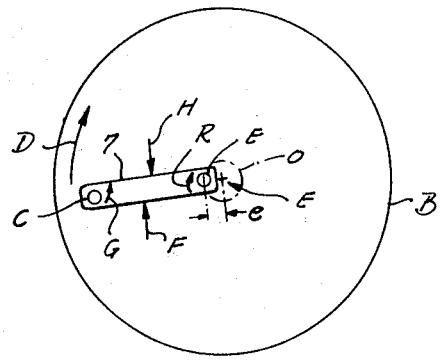
FIG. 7 is a diagram illustrating the orbiting movement of the electrode in accordance with the principles of the present invention.

Referring first to FIG. 7, from which the principles of the system of the present invention will become apparent, it can be seen that the axis of the head of the spark-erosion machine is represented at A and that the housing of the head is centered thereon as represented by the circle B. Moreover, the housing carries the pivot axis C in the direction of rotation about the axis A as represented by the arrow D, the axis C representing the pivot of a bearing body 7 upon which the electrode holder is journaled.

Figure 2:
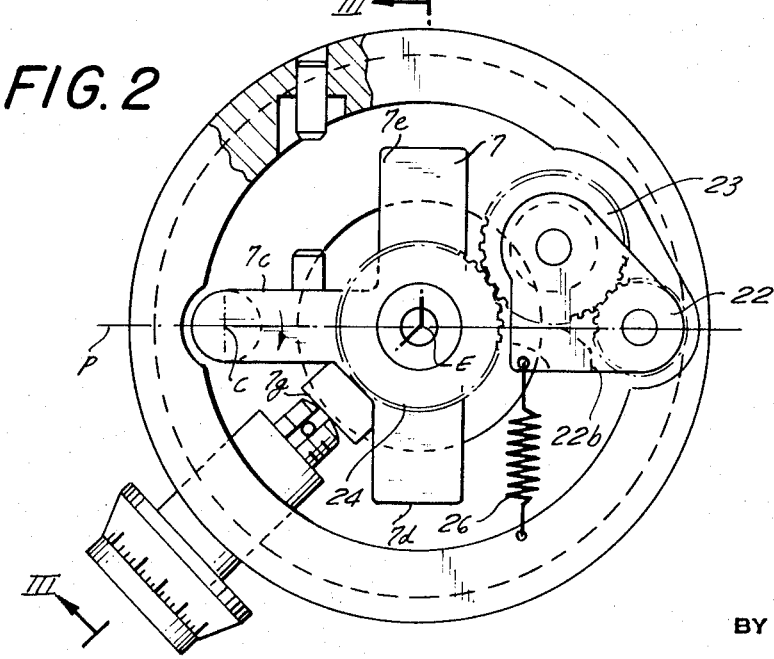
FIG. 2 is a cross-sectional view taken along the line II—II of FIG. 1.
Figure 3:
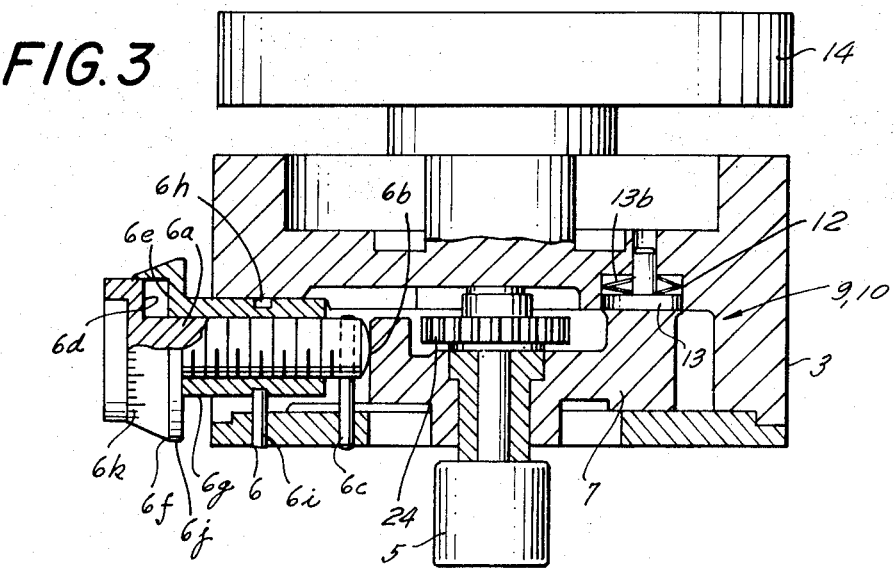
FIG. 3 is a cross-sectional view taken across the line III—III of FIG. 2.
Figure 5:
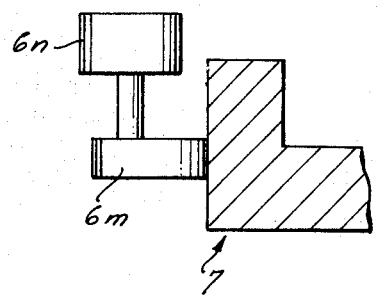
FIG. 5 is a detail view illustrating another embodiment of the invention.

The electrode holder is rotatable, in turn, about the axis E which may coincide with the axis A, but may be offset therefrom by an eccentricity $e$ by an adjusting means best seen at 6 in FIGS. 2 and 3 or FIG. 5. For the purposes of illustration, the adjusting means is shown to apply a force F to the bearing body 7, tending to swing this body in the counterclockwise sense about its axis C (arrow G) against the restoring force H of a spring or the like.

Since the entire assembly of adjusting means, bearing block 7, electrode, etc. rotates about the axis A, the axis E of the tool electrode describes an orbit O about the axis A while the electrode is rotated about its own axis (arrow R) as previously described. The angular velocity of the electrode is greater than the angular velocity of the assembly and the ratio of the speeds is determined by the planetary-gear ratio in accordance with conventional practices. The effective electrode diameter is $\Phi=2(e+r)$ where $e$ is the eccentricity of the orbit of the electrode as noted above and $r$ is the radius of the electrode describing the orbit; where the average gap width is $\Delta$, the bore formed by an electrode of diameter $2r$ will be $\Phi+2\Delta$ or $2(e+r+\Delta)$. When, however, elliptical or other noncircular configurations of the machining contour are desired, a cam is substituted for the adjusting screw (see FIG. 5) and acts upon the bearing body 7 in place of the adjusting means and may be effective to periodically vary the eccentricity $e$ in accordance with a relationship determined by the configuration of the cam.

Figure 1:
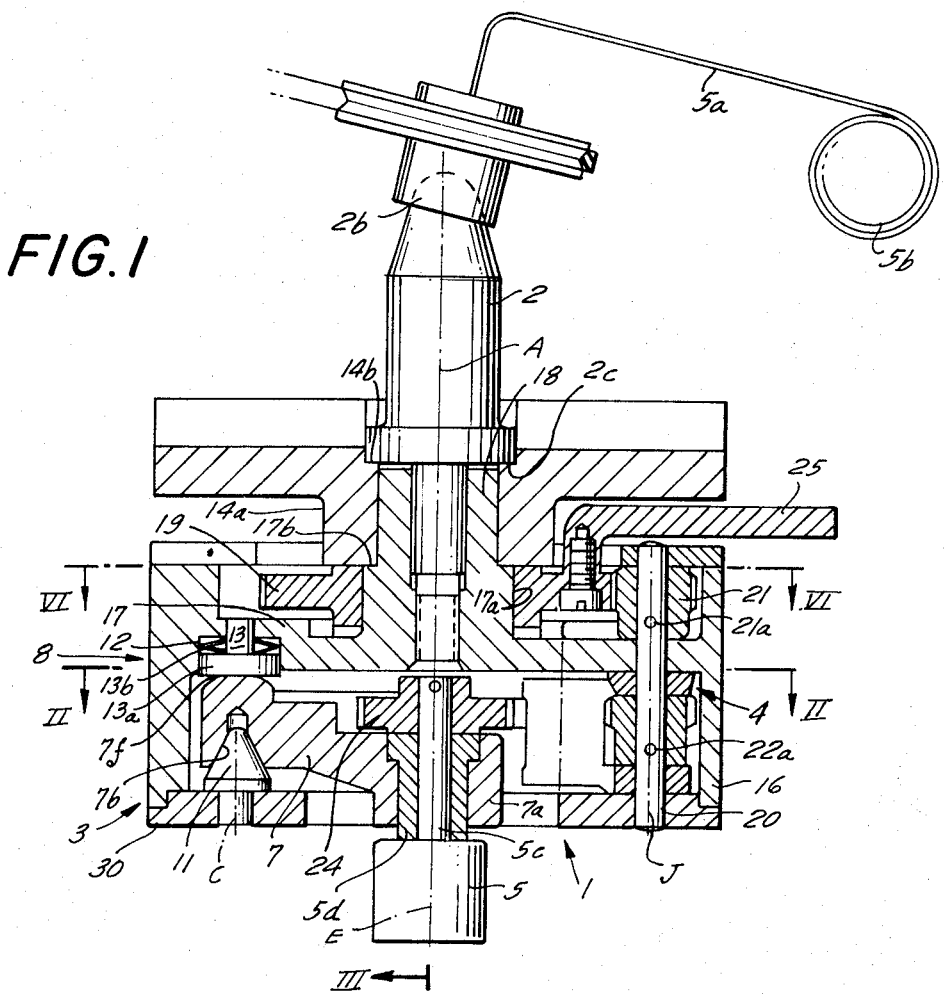
FIG. 1 is an axial cross-sectional view partly in diagrammatic form of a spark-erosion head, according to the present invention.
Figure 4:
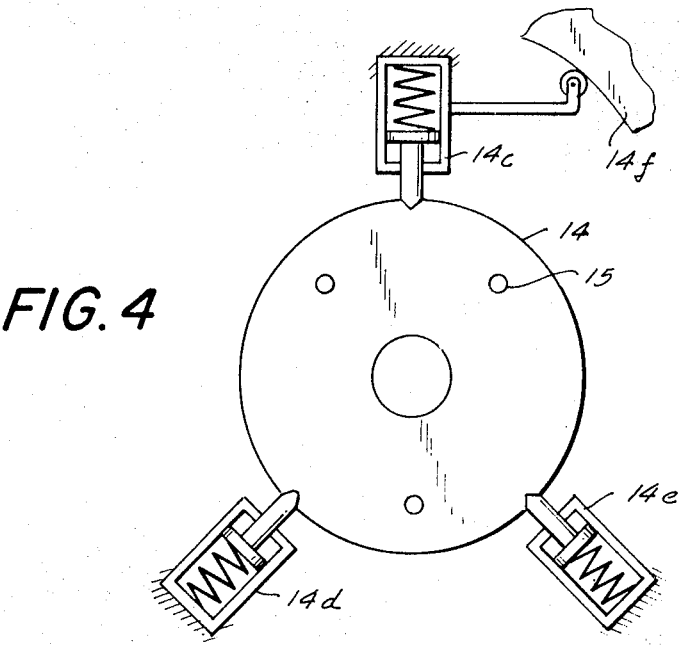
FIG. 4 is a diagrammatic view illustrating the means for supporting the head of FIGS. 1—3.

In FIGS. 1—3, we have shown a head for a spark-machining apparatus which embodies the principles of the present invention as described generally with reference to FIG. 7. Basically, the head 1 comprises a drive shaft 2 which may be coupled with a motor of the supporting structure by, for example, a V-belt-pulley arrangement 2a and a swivel coupling 2b, journaled in a flange 14 carried in the stationary structure of the apparatus as diagrammatically illustrated in FIG. 4. The head 1 further comprises a planetary-gear housing 3 whose upper plate 17 forms the planetary gear carrier in which a shaft 20 is journaled for rotation parallel to the axis A defined by the shaft 2. The plate 17 is formed with an axially extending boss 17a and a smaller diameter cylindrical boss or sleeve 18 fitting snugly about the shaft and formfitting with respect to the latter end, of course, in force-transmitting relationship therewith, the shoulder 17b between the boss 17a and the sleeve 18 abuts a cylindrical boss 14a extending downwardly from the flange 14 and forming a force-transmitting contact between the flange and the housing. The boss 14a rotatably receives the sleeve 18. At the upper end, the shaft 2 is provided with a shoulder 2c which abuts a countersunk recess surface 14b of the flange 14 to permit the flange 14 to take up axial thrust on the shaft 2 in either direction.

Within the housing 3, there is provided a planetary gear transmission 4 having a gear ratio such that the electrode holder 5 is rotated at a faster speed than the housing 3. The electrode holder 5 is constituted by a friction chuck through which a wire spark-erosion electrode 5a may be fed from a spool 5b by a feed arrangement of the type used in the wire-welding art and not material to the present improvement. The electrode holder 5 is formed with a stem or shaft 5c which is rotatable in a bearing 5d carried in the hub 7a of the bearing body 7. At its upper end, the tubular shaft 5c, through which the wire electrode is fed, is pinned to a pinion gear 24 constituting the driven gear of the planetary transmission.

As already described, the bearing body 7 is switched about an axis C parallel to the axis A and to the axis E of the electrode holder 5, as defined by a conical centering pin 11 which is received in a conical recess 7b of a radial arm 7c of the bearing body. The adjusting device for the electrode 5 is here shown to comprise a threaded screw arrangement generally designated at 6.

As illustrated in FIG. 3, this adjusting arrangement comprises an inner screw 6a whose right-hand end 6b bears against a pedestal 7f of the body 7 and which is slotted to receive a guide pin 6c preventing rotation of the screw 6a but permitting it to move radially through the wall of the housing 3. The head 6d of this screw is received within a recess 6e of a head 6f formed on a rotatable sleeve 6g having a circumferential slot 6h into which a pin 6i reaches to prevent axial displacement of the member 6f, 6g, but permitting free rotation thereof. The head 6f is, in turn, milled at 6j and provided with a scale at 6k to permit the sleeve 6g to be manually rotated and thereby advance the screw 6a which is threaded into the sleeve. In place of this adjusting means, a cam 6m may be provided to bear upon the body 7 as shown in FIG. 5, the cam being rotated by a drive represented diagrammatically at 6n to impart the desired contours to the machined member. The cam, therefore, constitutes a template for the contour to be machined.

From FIGS. 1–3, it is also apparent that the body 7 is provided with three arms, 7c, 7d and 7e, providing a three-point bearing system with the housing 3. The point-contact bearing members, represented diagrammatically at 8, 9 and 10, may include convex portions 7f of the respective arms which rest against planar head 13a of plungers 13 received in recesses 12 of the housing 3 and springloaded in the direction of the bearing body 7 by Belleville washers or dished-disk springs 13b.

The flange 14 is mounted in the spark-erosion machine by a threefold point-contact resilient support system represented at 14c, 14d and 14e and is centered by centering pins diagrammatically represented at 15 and preferably conical as shown for the pin 11 of FIG. 1. The housing for the head may be displaceable by a template 14f, if desired, to position the orbiting electrode with respect to the workpiece continuously or for any particular purpose.

Figure 6:
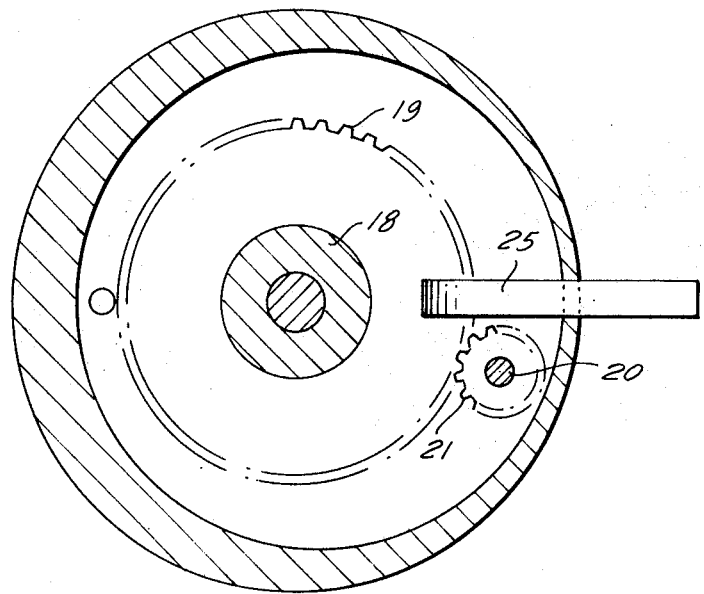
FIG. 6 is a cross-sectional view generally along the line VI—VI of FIG. 1.

The housing 3, moreover, has a cylindrical apron 16 which is integral with the disk-shaped central portion 17 and the bosses 17a, 18, and is closed by a plate 30 forming a journal for the lower end of the shaft 20. The planetary gear shaft 20 carries a planetary gear 21 which is pinned thereto at 21a and meshes with the stationary sun gear 19, the latter having a greater number of teeth and being of a larger diameter than the driven sun gear 24. The sun gear 19 is journaled on the boss 17a and is fixed against angular movement by a lever or arm 25 which reaches into the housing between the cylindrical apron 16 and the flange 14 (see FIG. 1). Hence, with rotation of the housing 3 about the axis A, the planetary gear 21 rotates about its axis J and rotatably drives a planetary gear 22 which is pinned to the shaft 20 at 22a. The gear 22 is received between the arms of a yoke 22b swingably mounted on the shaft 20 and carrying an idler gear 23 in mesh with the gear 22. A spring 26, affixed to the apron 16, engages the yoke 22b to draw the gear 23 into mesh with gear 24 and provide for a driving connection between the planetary gear shaft 20 and the shaft 5c. Since the gear 24 has a smaller number of teeth and diameter than the gear 19 (see FIG. 6) with equivalent gears 21 and 22, the angular velocity of the gear 24 and the electrode holder 5 will be greater than that of the shaft 2 and the housing 3. Because the point of attack of the spring-loaded gear 23 is on the opposite side of the median plane P defined by the axis C and E of the body 7 from the point of attack 7g and the adjusting device 6, the spring 26 also serves to bias the bearing block against the adjusting device. The operation of the system has, of course, been described in connection with FIG. 7.

We claim:

1. A head for a spark-erosion machine, comprising:
a support;
a housing journaled for rotation relative to said support about a first axis;
an electrode holder mounted on said housing for rotation relatively thereto about a second axis generally parallel to said first axis;
a transmission interconnecting said electrode holder and said housing for rotating said electrode holder about said second axis upon rotation of said housing about said first axis;
a bearing body received in said housing and rotatably carrying said electrode holder;
spring-loaded point-contact support members bearing upon said body at three spaced-apart locations in said housing for positioning same therein; and
a conical centering pivot mounting said body for swinging movement about a third axis offset from said first and second axes, but generally parallel thereto.

2. The head defined in claim 1, further comprising adjusting means in said housing for shifting said electrode holder relative to said first axis.

3. The head defined in claim 2 wherein said adjusting means includes a threaded-screw arrangement acting upon said holder transversely to said second axis.

4. The head defined in claim 2 wherein said adjusting means includes a template controlling the position of said electrode holder.

5. The head defined in claim 1, further comprising retaining means forming part of said machine and bearing with point contact upon said support, said support comprising a flange extending generally transversely to said first axis.

6. The head defined in claim 5, further comprising a shaft passing rotatably through said flange, said housing being affixed to said shaft for rotation thereby.

7. The head defined in claim 6 wherein said transmission means includes a planetary gear transmission.

8. The head defined in claim 8 wherein said planetary gear transmission comprises a driven gear carried by said electrode holder, and rotatable about said second axis, the sun gear centered on said first axis and fixed relative to said flange, and planetary gear means entrained with said housing and coupling said sun gear with said driven gear.

9. The head defined in claim 8 wherein said planetary gear means includes a planetary shaft extending generally parallel to said axes and journaled in said housing, a first planet gear meshing with said sun gear and fixed to said planet shaft, a second planet gear fixed to said planet shaft, a yoke swingably mounted on said planet shaft, an idler gear journaled on said yoke and meshing jointly with said second planet gear and said driven gear, and spring means bearing upon said yoke and urging said idler gear into mesh with said driven gear.

* * * * *